United States Patent [19]
Li et al.

[11] Patent Number: 5,909,295
[45] Date of Patent: Jun. 1, 1999

[54] HYBRID BI-DIRECTIONAL WAVELENGTH DIVISION MULTIPLEXING DEVICE

[76] Inventors: Jinghui Li, 30 Juniper Cresc., Ontario, Canada, K2E 6L5; Mark Farries, 26 Tiverton Dr., Nepean, Ontario; Joseph Ip, 57 Drainie Dr., Kanata, Ontario, both of Canada, K2L 3J7

[21] Appl. No.: 08/743,733
[22] Filed: Nov. 6, 1996
[51] Int. Cl.⁶ .................................... G02B 6/00
[52] U.S. Cl. ............................ 359/130; 385/37
[58] Field of Search ............................. 359/130; 385/37

[56] References Cited

U.S. PATENT DOCUMENTS

| | | | |
|---|---|---|---|
| 5,283,686 | 2/1994 | Huber | 359/337 |
| 5,608,825 | 3/1997 | Ip | 359/127 |
| 5,748,363 | 5/1998 | Duck et al. | 359/143 |

*Primary Examiner*—Edward Lefkowitz
*Attorney, Agent, or Firm*—Neil Teitelbaum & Associates

[57] ABSTRACT

An optical device simultaneously provides a multiplexing and demultiplexing function and combines dichroic WDM filter technology with Bragg grating filter technology. A plurality of adjacent sequential ports of a multi-port optical circulator serve as a vehicle for launching and receiving a multi-wavelength optical signal to be separated by the Bragg and dichroic filters. Other adjacent sequential ports having similar filters tuned to different wavelengths provide paths for combining the other wavelengths of light into a single signal. Conveniently a single circulating port serves as the input/output port of the device. The configuration can be applied an optical waveguide structure and, or more particularly to an optical fiber structure. Furthermore this configuration can combine multiplexing/demultiplexing function with a dispersion compensation function by adding a group of fiber Bragg gratings to a port of a circulator.

13 Claims, 7 Drawing Sheets

HYBRID BI-DIRECTIONAL WAVELENGTH DIVISION MULTIPLEXING DEVICE

This invention relates to multi-wavelength filtering devices and more particularly to a multi-channel multiplexer/demultiplexor using at least one multi-port optical circulator and a plurality of Bragg optical fiber gratings or other wavelength selective means.

BACKGROUND OF THE INVENTION

Optical systems are presently being employed in the communication of voice and video information as well as in the high speed transmission of data. Optical communication systems are desired because of the wide bandwidth available for the information signal channels.

Although this wide bandwidth is available, many of the existing optical fiber systems use only a single channel per optical fiber. Typically, this channel is transmitted at a wavelength of 1310 nm in one direction from a transmitting end to a receiving end and requires a second optical fiber to achieve bi-directional communication, however, recent increase in telecommunications traffic has resulted in a need for further fiber resources. One way this need was met, was to install additional optical fiber cables. Another was to increase the number of channels carried by same fibers.

Recently, technologies that can add additional channels to existing optical fiber cables already in the ground, have gained acceptance. These technologies seek to provide more than one channel on a single existing optical fiber and are therefore aimed at enhancing the efficiency of the existing fiber optic cable network. These technologies include wavelength division multiplexing (WDM) and bi-directional transmission.

When a number of wavelengths are multiplexed and transmitted on a single optical fiber, customarily, these channels must later be demultiplexed into separate channels or wavelengths of light. For example, it may be cost effective to transmit signals of wavelength $\lambda 1, \lambda 2, \lambda 3, \lambda 4, \lambda 5$, and $\lambda 6$ ($\lambda$ denoting a wavelength, lambda) along a single optical fiber, however, demultiplexing means are required to separate the light into six separate channels. Of course, it is desired to perform this demultiplexing at a minimum cost and with as little signal loss as possible.

Various types of optical filters have been contemplated and used to separate light of differing wavelengths. Unfortunately, coupling and other losses associated with many of these arrangements have led to devices that are less than satisfactory. For example, dichroic filters are widely used as WDM devices; however, the reduction of channel spacing as well as the passband is limited by the current interference filter technology.

As of late, in-fiber Bragg gratings have become more prevalent in the field of fiber optics. An optical system utilizing Bragg gratings in combination with an optical circulator is shown in U.S. Pat. No. 5,283,686 issued Feb. 1, 1994 in the name of David Huber and assigned to General Instrument Corporation, Jerrold Communications, Hatboro, Pa. However, there are certain problems with the use of Bragg gratings alone; for example, the coupling losses in utilizing Bragg gratings and circulators alone as a means of multiplexing/demultiplexing in high density applications may in some instances be prohibitive. Furthermore, low yield, and cost are further disadvantages.

It is an object of this invention to provide a multi-channel demultiplexor that is capable of demultiplexing a multi-channel signal with less loss than known prior art demultiplexors and or multiplexing a plurality of channels into a single signal more conveniently and with less loss than in many other prior art devices.

It is a further object of the invention to provide a multi-channel demultiplexor that is configured in a manner to minimize loss normally associated with serial-type architectures.

SUMMARY OF THE INVENTION

In accordance with the invention, there is provided, an optical device for multiplexing a first plurality of optical signals into an output optical signal and for demultiplexing an input optical signal into a second plurality of other optical signals comprising:

a multi-port optical circulator having an input/output port for launching the input optical signal into the device and for receiving the output signal, a plurality of sequential circulating ports for demultiplexing the input optical signal into the second plurality of other optical signals;

a plurality of other sequential optical ports for multiplexing the first plurality of optical signals into the output optical signal, at least one of the plurality of sequential ports having a Bragg grating coupled thereto, and, at least one of the plurality of other sequential ports having a Bragg grating coupled thereto, the Bragg gratings for passing one or more predetermined wavelengths of light and for reflecting at least one or more other wavelengths of light.

In accordance with another aspect of the invention, there is further provided, an optical device for multiplexing a first plurality of optical signals into an output optical signal and for demultiplexing an input optical signal into a second plurality of other optical signals comprising:

a multi-port optical circulator having an input port for launching the input optical signal into the device and an output port for receiving the output optical signal, a plurality of sequential circulating ports for demultiplexing the input optical signal into the second plurality of other optical signals;

a plurality of other sequential optical ports for multiplexing the first plurality of optical signals into the output optical signal, at least one of the plurality of sequential ports having a Bragg grating coupled thereto, and, at least one of the plurality of other sequential ports having a Bragg grating coupled thereto, the Bragg gratings for passing one or more predetermined wavelengths of light and for reflecting at least one or more other wavelengths of light.

Advantageously this invention provides the capability of both multiplexing and demultiplexing optical signals with minimal loss. As well, utilizing a single circulator in combination with Bragg fibre gratings alone or with interference filters allows for the device to be relatively compact. Temperature stabilization of the optical circuitry is thus less complex and costly.

Further, utilizing a plurality of sequential ports on one side of an input port to support the flow of optical information in one direction, and a plurality of other sequential ports on another side of an input/output port to control the flow of optical information in another direction reduces loss normally associated with combining these functions on separate devices; and, as well affords the convenience of including other functionality such as providing dispersion compensation on one or more of the circulating ports.

This invention further provides advantages related to utilizing combined Bragg grating technologies with conventional dichroic optical filter technology to afford multi-channel multiplexer and demultiplexing circuit. By spacing the channels in a predetermined manner, wherein closely spaced adjacent channels are separated by Bragg gratings and further spaced non-adjacent channels are separated by WDM dichroic filters, the advantages of each technology is maximized. Therefore the channel spacing limitations of WDM devices based on dichroic filters can be overcome.

Aspects of the invention provide the following advantages:

Due to the configuration and hybrid nature of the preferred embodiment which utilizes interference filters and Bragg gratings, the channel spacing can be smaller than that based on a structure having only interference filters;

The insertion loss can be smaller than that of a functionally similar device having only interference filters or a device having a circulator and Bragg gratings coupled thereto;

The device can be easily upgraded to one having a larger channel capacity; and, dispersion compensation can be integrated into this device making it functionally advantageous and compact.

BRIEF DESCRIPTION OF THE DRAWINGS

Exemplary embodiments of the invention will now be described in conjunction with the drawings, in which.

DETAILED DESCRIPTION

Figure 1:
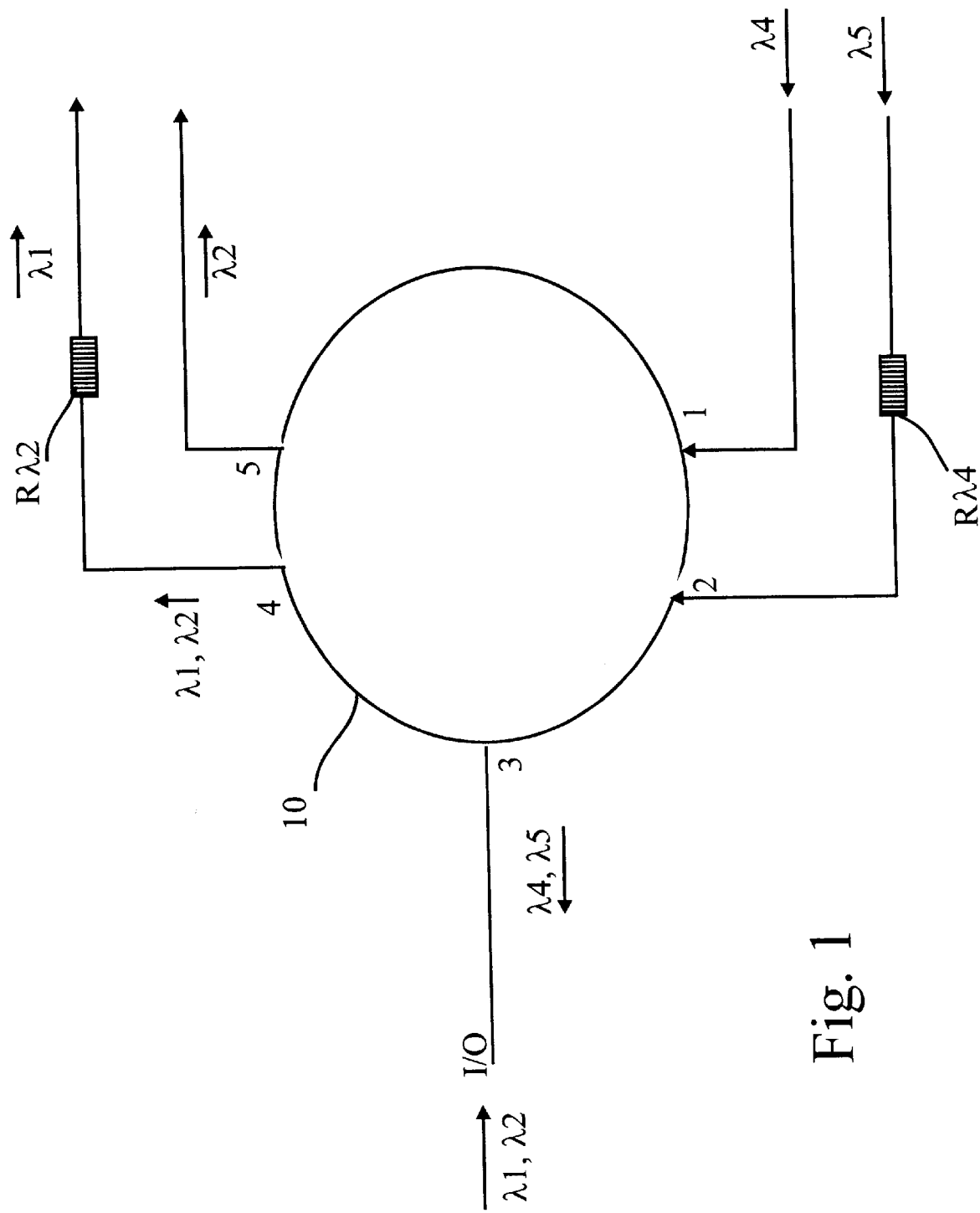
FIG. 1 is a schematic diagram of an optical circuit for multiplexing and demultiplexing optical signals launched into an optical circulator.

Referring now to FIG. 1, an optical circuit is shown which serves as both a multiplexer and demultiplexor. Conveniently circulating means in the form of a 5 port optical circulator 10 is used in a symmetric manner wherein an input/output port is located at a centrally disposed port 3, having a same number of ports on either side of the device. However this is clearly a design choice and the circuit is not limited to this symmetric architecture. In FIG. 1, sequential ports 1 and 2 provide for multiplexing of two optical signals $\lambda 4$, and $\lambda 5$ launched into ports 1 and 2 respectively into a single optical signal $\lambda 4$, $\lambda 5$ which exits the I/O port 3 of the circulator 10. Further, sequential ports 4 and 5 of the circulator provide a means of demultiplexing two optical signal $\lambda 1$ and $\lambda 2$ launched into I/O port 3. A Bragg in-line grating R$\lambda 4$ is provided within an optical fibre coupled to port 2 for reflecting the optical signal of wavelength $\lambda 4$ launched into port 1 of the circulator 10. Similarly, a Bragg in-line grating R$\lambda 2$ is provided within an optical fibre coupled to port 4 for reflecting the optical signal of wavelength $\lambda 2$ launched into port 1 of the circulator 10, however the grating passes other wavelengths of light.

In operation, the circuit functions simultaneously as multiplexer/demultiplexor in the following manner. As a demultiplexor, input signal $\lambda 1$, $\lambda 2$ is launched into the I/O port 3 and is circulated to port 4 of the circulator where the light signal is separated into two channels. A first channel $\lambda 1$ propagates through the grating R$\lambda 2$ wherein the second channel or wavelength $\lambda 2$ is reflected back to port 4 and circulates to port 5 where the signal of wavelength $\lambda 2$ exits. As a multiplexer two input signals $\lambda 4$ and $\lambda 5$ are launched into optical fibres coupled to ports 1 and 2 respectively of the circulator 10. The signal of wavelength $\lambda 4$ circulates from port 1 to port 2. After exiting port 2 the signal is reflected by Bragg filter R$\lambda 4$ and circulates from port 2 to the I/O port 3 where it is combined with the optical signal of wavelength $\lambda 5$ launched into port 2 of the circulator 10.

Figure 2:
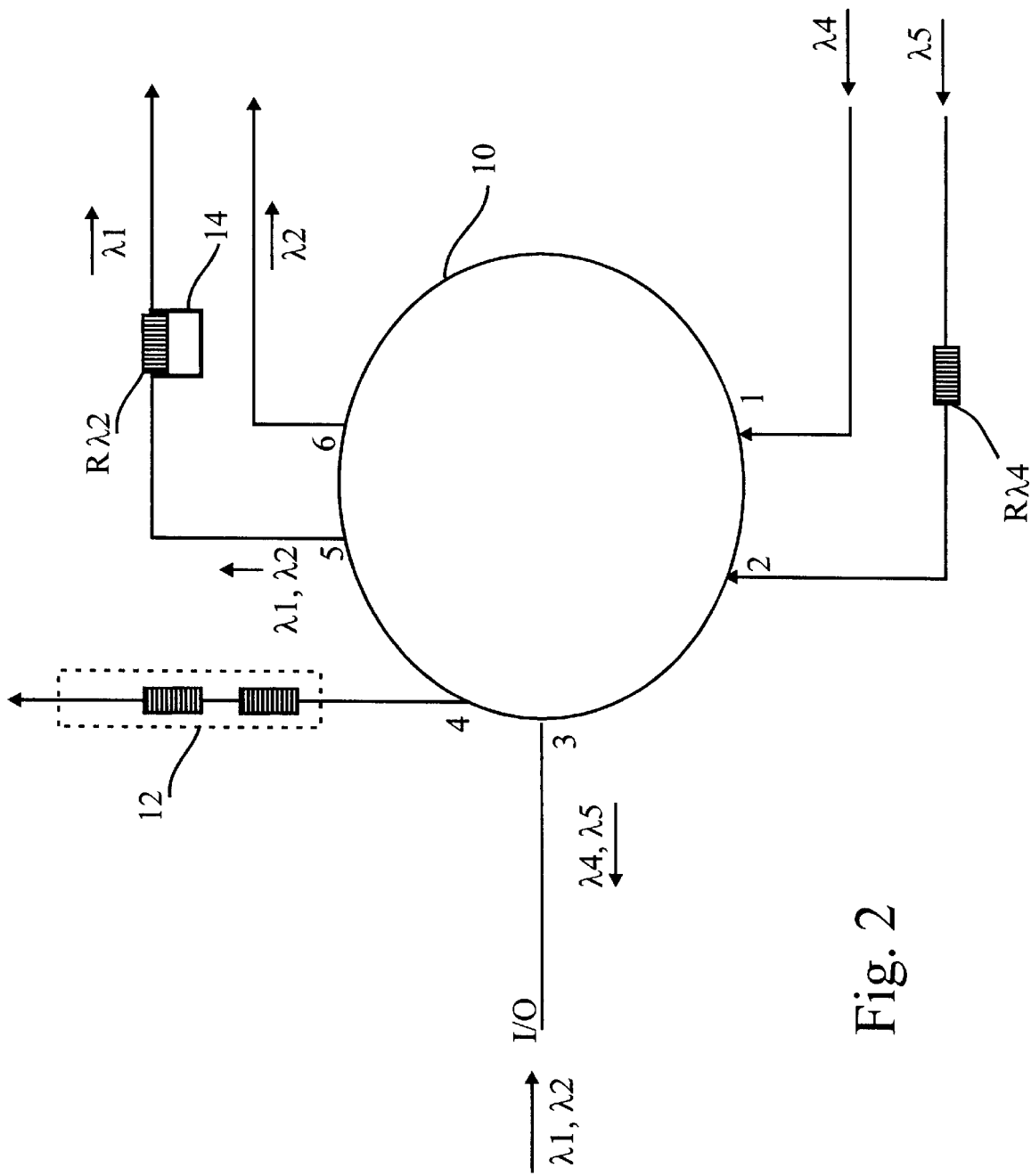
FIG. 2 is a schematic diagram of the optical circuit shown in FIG. 1 including a tunable wavelength dependent Bragg filter and including Bragg in-line filters at a port for dispersion compensation.

Referring now to FIG. 2 an alternative embodiment of the invention is shown wherein a 6-port circulator is utilized to incorporate and integrate a dispersion compensation circuit into the optical signal path that is being demultiplexed. However, this circuit is merely exemplary and such compensation means can be disposed on other ports of circulator 10. The dispersion compensation element 12 shown is comprised of Bragg gratings connected together serially along one optical fibre coupled to port 4. However, since typically dispersion compensation means in the form of Bragg gratings rely on multiple gratings serially coupled the length of a dispersion compensation path may become prohibitively long. By using a single multi-port optical circulator, the architecture in accordance with this invention, provides a convenient means of coupling several shorter paths of Bragg compensators coupled to a plurality of circulating ports of a single circulator, obviating the requirement and losses associated with the coupling of plural optical circulators serially.

Figure 3:
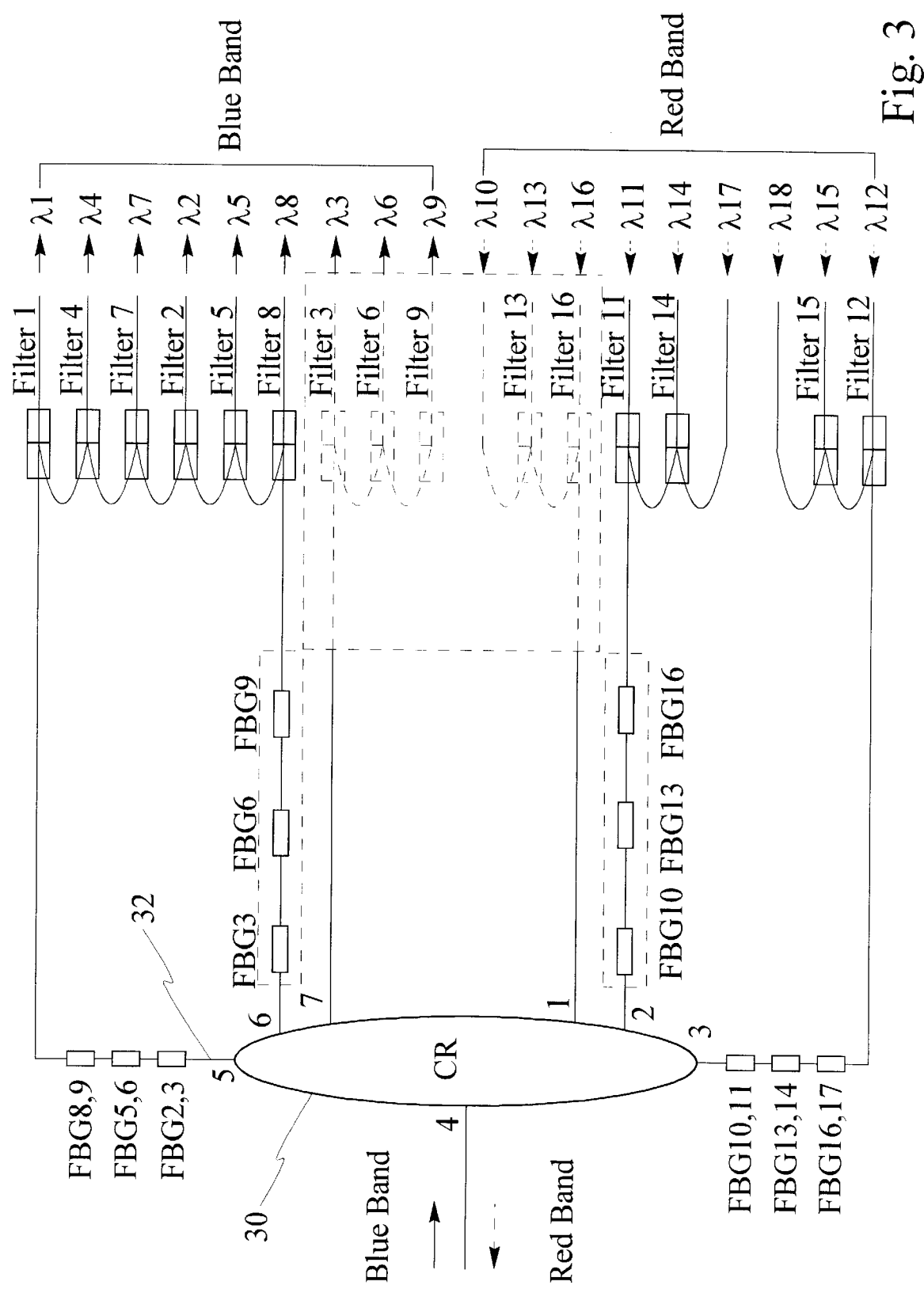
FIG. 3 is a schematic diagram of an alternative embodiment of the invention wherein both Bragg in-line filters are used with conventional WDM dichroic optical filters.

Referring now to FIG. 3, a preferred embodiment of the invention is shown, wherein conventional WDM dichroic filter technology is combined with the use of optical fibre Bragg in-line filters to optimize the advantages of both technologies while obviating the disadvantages of WDM dichroic filters. More specifically, the narrow band Bragg gratings are used to separate closely spaced adjacent channels and the WDM filters are utilized to separate signals having substantial channel space therebetween. In order to more simply understand the circuit shown in FIG. 3, it should be assumed that signals $\lambda 1, \lambda 2, \lambda 3, \ldots \lambda 12, \lambda 13, \ldots \lambda 17$ are closely spaced channels/wavelengths wherein $\lambda 1$ is adjacent $\lambda 2$ which is adjacent $\lambda 3$ and so on. In operation, a blue band signal comprising wavelengths $\lambda 1$ to $\lambda 9$ is launched into I/O port 4 of the 7-port optical circulator 30. The blue band signal circulates from port 4 to port 5 where it propagates along an optical fibre 32. Wavelengths $\lambda 2, \lambda 3, \lambda 5, \lambda 6, \lambda 8$ and $\lambda 9$ are reflected back to port 5 by the in-line gratings FBG 2,3, FBG 5,6, FBG 8,9 and this light is circulated to port 6. Wavelengths $\lambda 1, \lambda 4$ and $\lambda 7$ which are distantly separated in wavelength are transmitted through the gratings FBG 2,3, FBG 5,6, and FBG 8,9 and are separated by the WDM filters 1, 4, and 7 respectively. Advantageously, this arrangement allows for less expensive wide band WDM filters to be used to separate the spaced non-overlapping channels. Wavelengths λ2, λ3, λ5, λ6, λ8, and λ9 exit port 6 where wavelengths λ3, λ6 and λ9 are reflected back by FBG3, FBG6, and FBG9 and are circulated to port 7 of the circulator 30. Wavelengths λ8, λ5 and λ2 are transmitted through these gratings and are separated by WDM filters 8, 5, and 2 respectively. Simultaneously and in a reverse order, ports 1, 2, and 3 in combination with FBGs 10 through 17 and with WDM filters 11 through 16 provide a multiplexing circuit where wavelengths λ10 through λ18 are combined to form a Red band signal exiting the circulator at I/O port 4. In the embodiment shown in FIG. 3 and FIG. 4 it can be seen that higher channel capacity can be added by including additional ports. For example, in FIG. 4, ports 9 and 1 allow wavelenghts λ3, λ6, and λ9 to be demultiplexed, and wavelengths λ10, λ13, and λ16 to be multiplexed, respectively.

Figure 4:
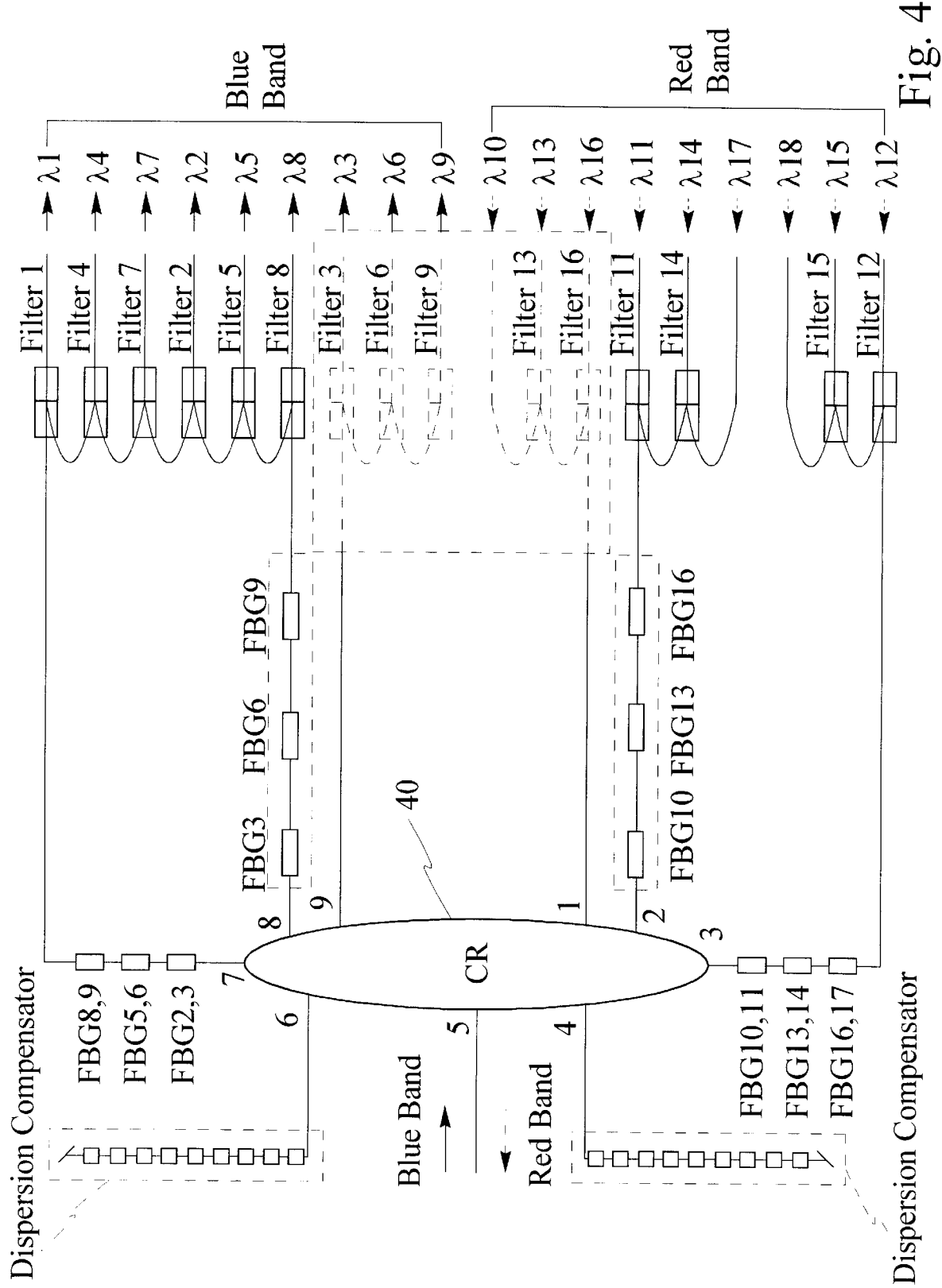
FIG. 4 is a schematic diagram of a circuit similar to that shown in FIG. 3 wherein dispersion compensation Bragg fiber gratings are provided.

Turning now to FIG. 4, 9-port circulator 40 is shown configured as a demultiplexor/multiplexer with dispersion compensation in accordance with this invention. In this embodiment, dispersion compensation means in the form of Bragg dispersion compensation circuits 42a and 42b are shown coupled to ports 6 and 4 respectively. A Fibre Bragg grating dispersion compensation circuits is described in a paper entitled Dispersion Compensation Over Distances in Excess of 500 km for 10-Gb/s Systems Using Chirped Fiber Gratings, by W. H. Loh, et al in IEEE Photonics Technology Letters, Vol. 8, No, 7 Jul. 1996 incorporated herein by reference.

Figure 5:
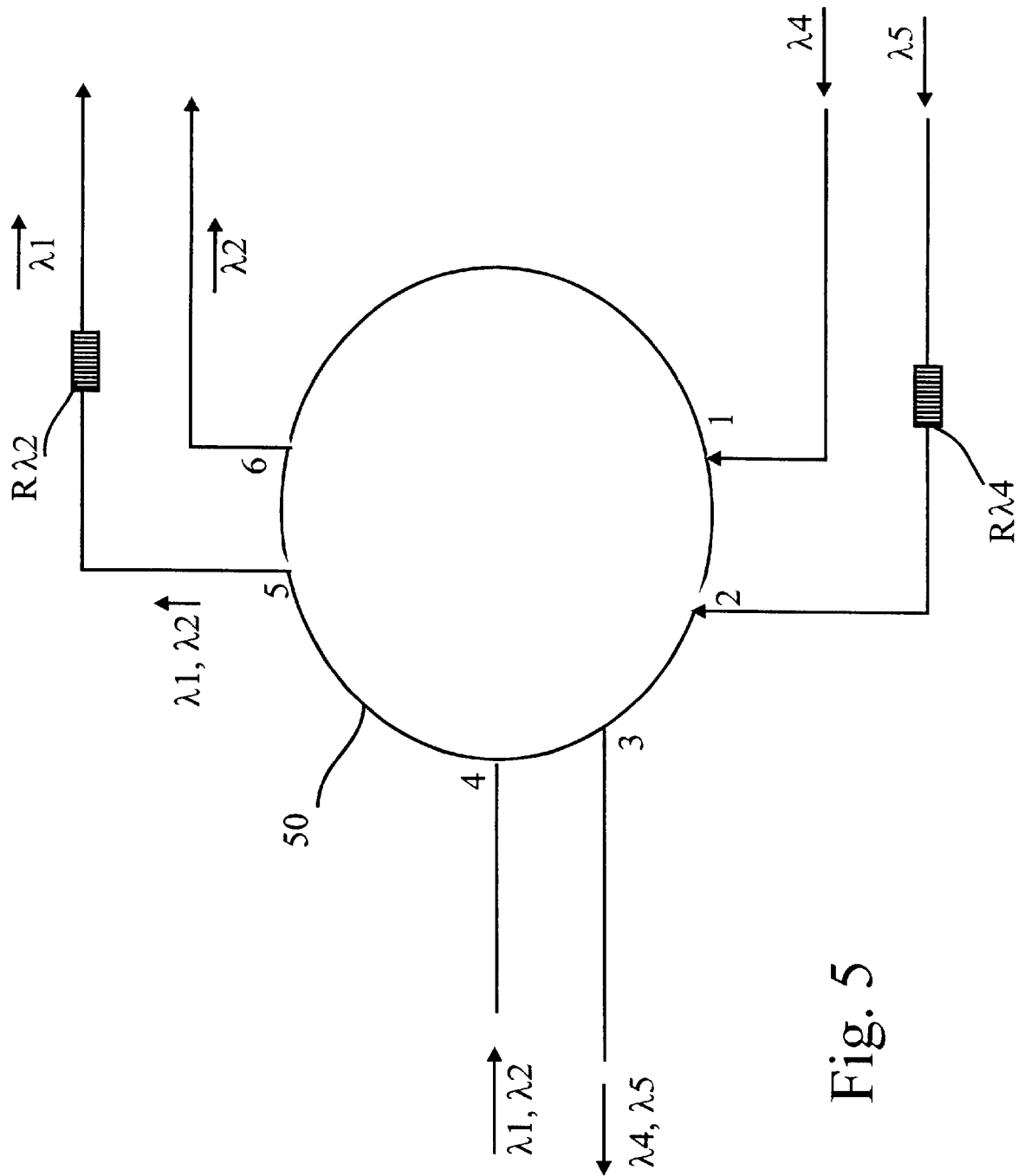
FIG. 5 is a schematic diagram of a circuit in accordance with the invention wherein separate input and output ports are provided.

FIG. 5 is similar to that of FIG. 1, however shows an alternative and less preferred embodiment of the invention wherein a separate input and output port is provided by using two adjacent circulating ports 3 and 4.

Figure 6:
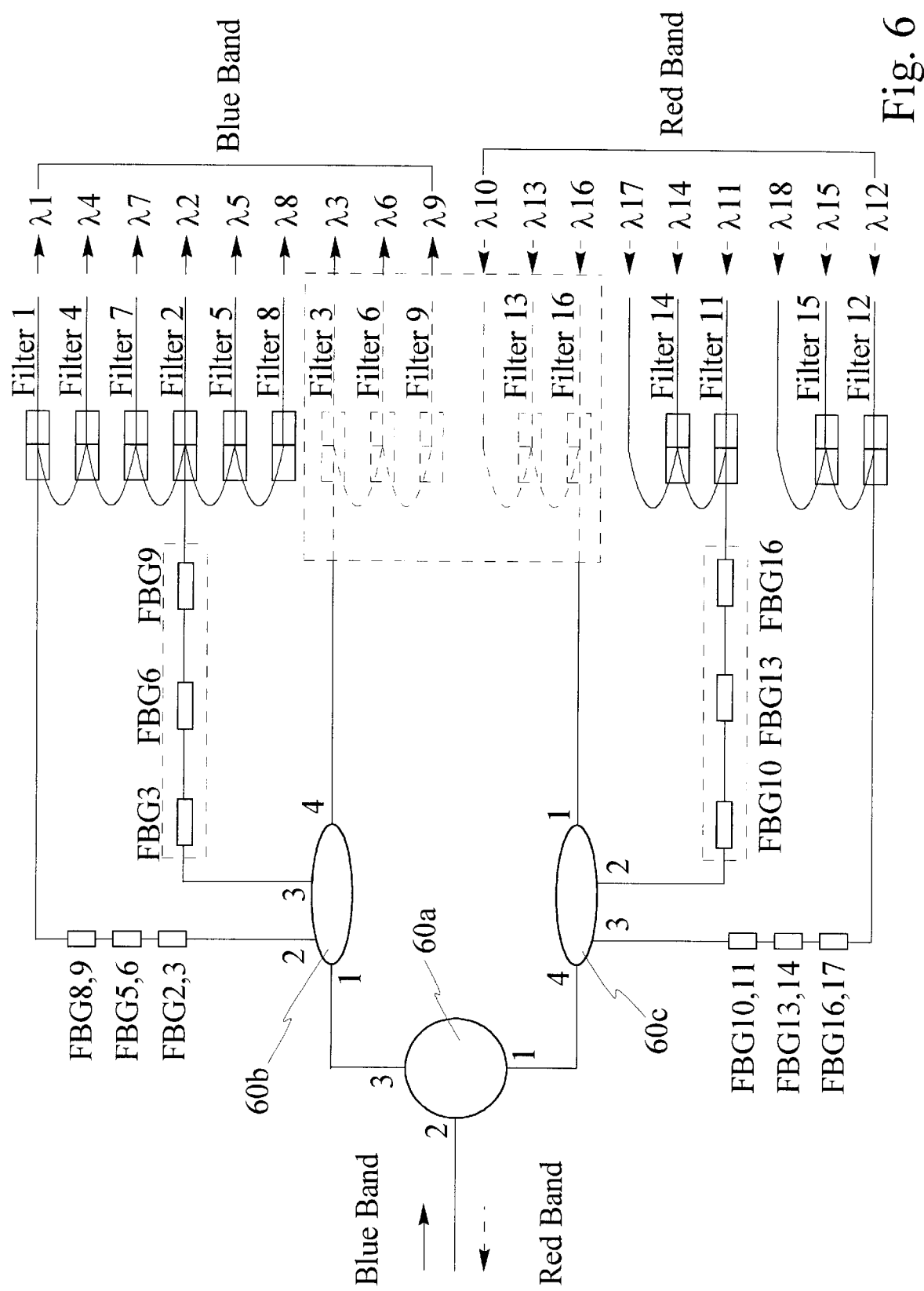
FIG. 6 is a schematic diagram of an embodiment of the invention wherein circulating means are shown in the form of three optically coupled optical circulators; and, FIG. 7 is an alternative embodiment of the invention wherein two optical circulators are interconnected to provide a plurality of sequential ports.
Figure 7:
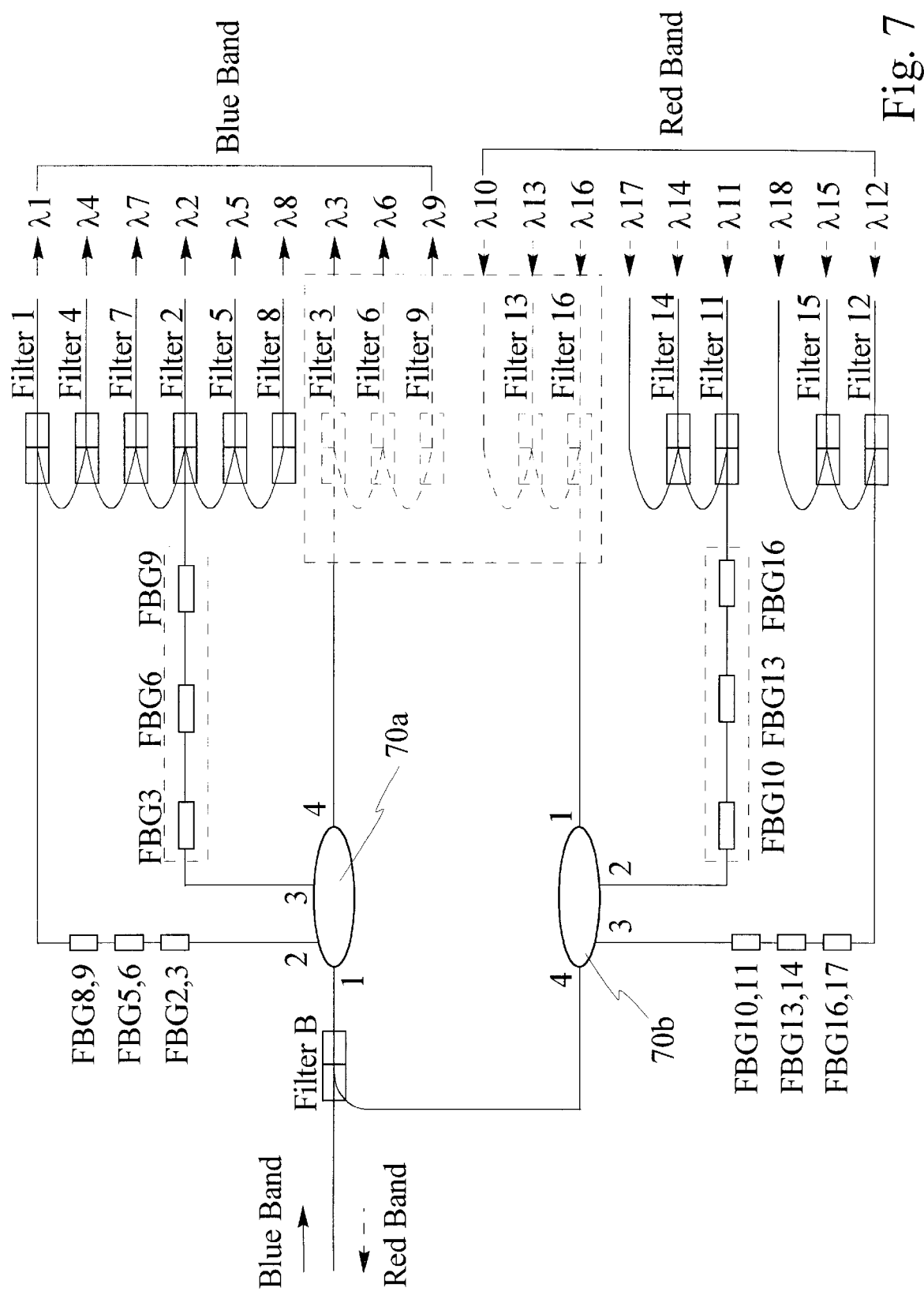

Turning now to FIG. 6 an embodiment of the invention is illustrated wherein the multi-port 5, 7 and 9-port optical circulators described in embodiments heretofore are replaced with circulating means in the form of three optical circulators 60a, 60b and 60c coupled to provide essentially the same functionality as the single multi-port optical circulators 20, 30, etc. in earlier embodiments. Here, a first 3-port circulator 60a is optically coupled to two 4-port circulators 60b and 60c. Although there is associated loss by having an optical signal exit a port of one circulator and enter a port of another circulator sequentially, to be circulated to yet a next port, in some instances, this circuit may be preferred. Alternatively, FIG. 7 shows an embodiment wherein two 4-port circulators 70a and 70b form circulating means for demultiplexing a blue band signal into wavelengths λ1 to λ9 and simultaneously multiplexing a red band signal comprising wavelengths λ10 to λ18 into a single signal. A WDM filter B at the input port 1 of the circulator 70a provides a means for combining the red band signal onto the same optical path as the blue band signal being launched into the device.

Of course numerous other embodiments and advantages may be envisaged without departing from the spirit and scope of the invention.

What we claim is:

1. An optical device for multiplexing a first plurality of optical signals into a multiplexed output optical signal and for demultiplexing a multiplexed input optical signal into a second plurality of other demultiplexed optical signals comprising: circulating means having an input/output port for launching the multiplexed input optical signal into the device and for receiving the multiplexed output signal, the input/output port disposed between a first and a last port of the circulating means, the circulating means having a plurality of sequential circulating ports for demultiplexing the multiplexed input optical signal into the second plurality of other demultiplexed optical signals, a plurality of other sequential optical ports for multiplexing the first plurality of optical signals into the multiplexed output optical signal, the first plurality of optical signals launched into a plurality of waveguides, at least one of the plurality of sequential ports having a Bragg grating coupled thereto, and, at least one of the plurality of other sequential ports having a Bragg grating coupled thereto, the Bragg gratings for passing one or more predetermined wavelengths of light and for reflecting at least one or more other wavelengths of light.

2. An optical device as defined in claim 1, wherein the input/output port is disposed to receive a signal from an adjacent port and to transmit a signal to another adjacent port.

3. An optical device as defined in claim 2, comprising additional wavelength dependent means optically coupled to at least one of the Bragg gratings for separating or combining predetermined wavelengths of light.

4. An optical device as defined in claim 2, comprising dispersion compensation means coupled to at least one of the circulating ports.

5. An optical device as defined in claim 4, wherein the dispersion compensation means comprises at least a Bragg grating.

6. An optical device as defined in claim 1, wherein the circulating means comprises a single multi-port optical circulator.

7. An optical device as defined in claim 1, wherein the circulating means comprises a plurality of optical circulators each having at least one port optically coupled to at least one of the other circulators.

8. An optical device as defined in claim 2, wherein the optical circulating means is an n port device, the $((n-1)/2+1)^{th}$ port being the input/output port, there being $(n-1)/2$ demultiplexing ports and $((n-1)/2$ multiplexing circulating ports, wherein n is an odd number greater than 3.

9. An optical device as defined in claim 3, wherein the additional wavelength dependent means comprise dichroic filters.

10. An optical device for multiplexing a first plurality of optical signals into a multiplexed output optical signal and for demultiplexing a multiplexed input optical signal into a second plurality of other optical signals comprising:

a multi-port optical circulator having an input port for launching the multiplexed input optical signal into the device and an output port for receiving the multiplexed output optical signal, the input port and the output port disposed between a first and a last port of the optical circulator, a plurality of sequential circulating ports for demultiplexing the multiplexed input optical signal into the second plurality of other optical signals;

a plurality of other sequential optical ports for multiplexing the first plurality of optical signals into the multiplexed output optical signal, at least one of the plurality of sequential ports having a Bragg grating coupled thereto, and, at least one of the plurality of other sequential ports having a Bragg grating coupled thereto, the Bragg gratings for passing one or more predetermined wavelengths of light and for reflecting at least one or more other wavelengths of light.

11. A device as defined in claim 10, including a plurality of dichroic filters coupled to at least one of the Bragg gratings.

12. A device as defined in claim 10, wherein the input port and the output port is a same port.

13. An optical device for multiplexing a first plurality of optical signals into a multiplexed output optical signal and for demultiplexing a multiplexed input optical signal into a second plurality of other optical signals comprising:

circulating means having an input and output port for launching the multiplexed input optical signal into the device and for receiving the multiplexed output signal, said circulating means having a plurality of sequential circulating ports for demultiplexing the multiplexed input optical signal into the second plurality of other optical signals, and a plurality of other sequential optical ports for multiplexing the first plurality of optical signals into the multiplexed output optical signal, at least some of the sequential ports having a Bragg grating coupled thereto for separating closely spaced adjacent channels, said sequential ports further having dichroic WDM filter means optically coupled thereto for further separating non-adjacent channels.

* * * * *